United States Patent [19]

Nishikawa et al.

[11] Patent Number: 4,534,236
[45] Date of Patent: Aug. 13, 1985

[54] VIBRATION AND NOISE REDUCTION MEANS FOR A TRANSMISSION VEHICLE

[75] Inventors: Masao Nishikawa, Tokyo; Takashi Aoki; Yoichi Sato, both of Wako; Hiroshi Yoshizawa, Kamifukuoka, all of Japan

[73] Assignee: Honda Giken Kogyo Kabushiki Kaisha, Tokyo, Japan

[21] Appl. No.: 475,604

[22] Filed: Mar. 15, 1983

[51] Int. Cl.³ .................. F16H 3/08; F16D 21/02
[52] U.S. Cl. .................................. 74/364; 192/48.91; 464/180
[58] Field of Search ............. 74/363, 364, 357, 359; 192/48.91; 464/180

[56] References Cited

U.S. PATENT DOCUMENTS

| 828,826 | 8/1906 | Prescott | 464/180 X |
|---|---|---|---|
| 1,807,798 | 6/1931 | Short | 464/180 X |
| 2,346,432 | 4/1944 | Heintz | 464/180 X |
| 2,427,505 | 9/1947 | Newcomb | 464/180 X |
| 2,725,758 | 12/1955 | Dickey | 74/359 |
| 2,819,624 | 1/1958 | Brown, Jr. et al. | 74/359 X |
| 3,799,002 | 3/1974 | Richards | 192/48.91 X |
| 3,931,874 | 1/1976 | Braun et al. | 192/48.91 X |
| 4,016,962 | 4/1977 | Black | 464/180 X |
| 4,287,973 | 9/1981 | Eichinger et al. | 192/48.91 X |
| 4,289,223 | 9/1981 | Strehler et al. | 192/48.91 |

FOREIGN PATENT DOCUMENTS

| 462956 | 2/1950 | Canada | 192/48.91 |
|---|---|---|---|
| 1297032 | 12/1962 | France | 192/48.91 |
| 2024341 | 1/1980 | United Kingdom | 192/48.91 |

Primary Examiner—George H. Krizmanich
Assistant Examiner—Dirk Wright
Attorney, Agent, or Firm—Armstrong, Nikaido, Marmelstein & Kubovcik

[57] ABSTRACT

A transmission for vehicles including a plurality of alternative gear trains. It comprises a mechanism for bringing an end face of a boss of at least one gear, not concerning the power transmission, on a shaft and a surface of another member, relatively rotating with respect to the gear, on the shaft into slideable contact with each other under force of a spring. Vibration and noise due to those gear trains not contributing to the power transmission are effectively prevented.

4 Claims, 4 Drawing Figures

VIBRATION AND NOISE REDUCTION MEANS FOR A TRANSMISSION VEHICLE

BACKGROUND OF THE INVENTION

1. Field of the Invention

The present invention relates to a transmission for vehicles. More specifically, it relates to a transmission for vehicles which includes a vibration control mechanism for the gears.

2. Description of Relevant Art

Transmissions for vehicles generally include a number of gear trains in which, at certain point of time, only one gear train is transmitting power, while the other gear trains are not. These idling gear trains have gears which are caused to vibrate by torque variations of the engine. When such vibration occurs, the mutually engaging gears hit each other because of the backlashes, provided therebetween, thus producing noise. The level of this noise rises as the virtual inertia moment of the vibrating gear becomes large. In certain cases, it may rise so high as to give a passenger an unpleasant feeling.

The hitting of gears may be prevented to some extent by possibly reducing respective backlashes of the gears. Where the backlashes are reduced, however, another problem can be caused in that a humming may be produced. Moreover, in the case of automatic and semi-automatic type transmissions in which the speed shifting operation is generally effected by way of an engagement or disengagement of a clutch or a brake under hydraulic pressure, a shock will be caused when shifting the speed.

As a countermeasure to soften the shock in the shifting of speed, there has been proposed a transmission for vehicles in which the transient characteristic is improved for the pressure variation during operation of a clutch or a brake, thereby to make the shifting of speed as smooth as possible. By such way, however, there has not been resulted any sufficient effect in reducing the above-noted vibration problem.

The present invention is accomplished to effectively solve such problems in conventional transmissions for vehicles.

SUMMARY OF THE INVENTION

According to the present invention, there is provided a transmission for vehicles including an engine and at least one drive wheel, comprising a first shaft driven by the engine, a second shaft for driving the drive wheel, a plurality of gear trains interposed between the first and second shafts, the gear trains being selectable for transmitting a power of the engine, at least one gear member arranged in one of the gear trains and fitted on either of the shafts, a rotatable member relatively rotatable with respect to the gear member and slideably fitted on the same shaft, and resilient member for resiliently forcing said rotatable member to be brought into friction-wise slideable contact with the gear member while the corresponding gear train is left unselected.

Accordingly, it is an object of the present invention to provide a transmission for vehicles in which vibration and noise due to those gear trains not contributing to the power transmission are effectively prevented and a part of the engine's torque variation is effectively absorbed and moderated, thus permitting a smooth and calm operation to be achieved. The above and further features, objects and advantages of the present invention will more fully appear from the following detailed description of preferred embodiments of the invention when the same is read in conjunction with the accompanying drawings.

DETAILED DESCRIPTION OF PREFERRED EMBODIMENTS

Figure 1:
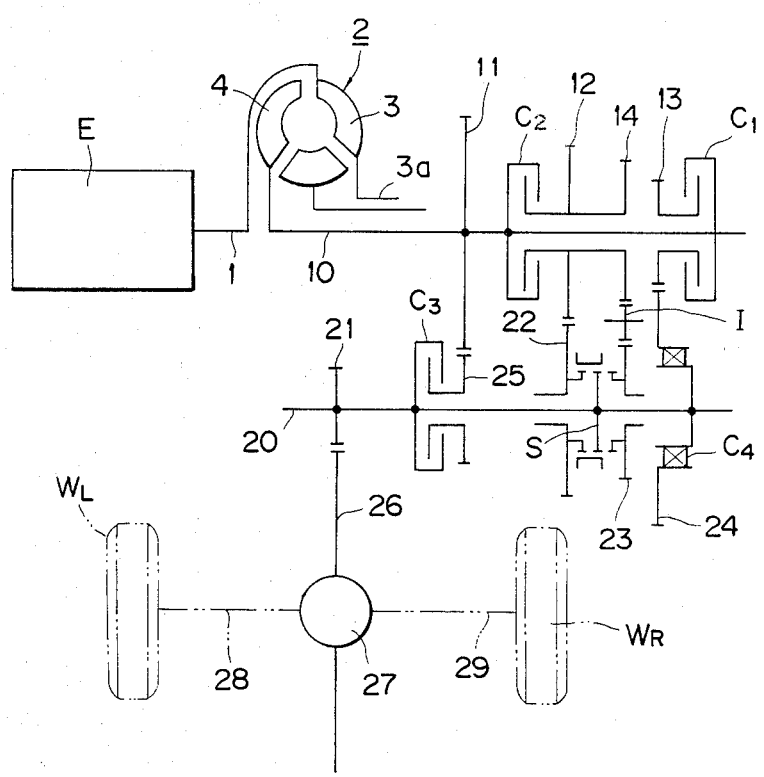
FIG. 1 is a schematic representation of a transmission for explanation of a transmission route of torque.

In FIG. 1, an output shaft 1 of the engine E is connected to a pump 3 of a torque convertor 2. The pump has a shaft 3a connected to a hydraulic pump (not shown).

The torque convertor 2 has a turbine 4 connected to a mainshaft 10 which has a third speed drive gear 11, a second speed clutch C2 and a first speed clutch C2 all fixed thereon in order from the left to right in FIG. 1. Moreover, the mainshaft 10 has a second speed drive gear 12 and a first speed drive gear 13 both rotatably loose-fitted thereon, and is adapted to rotate integrally with the second speed drive gear 12, when the clutch C2 is connected, and with the first speed drive gear 13, when the clutch C1 is connected. Further, integrally with the second speed drive gear 12, there is provided a reverse drive gear 14.

A countershaft 20 is arranged in parallel with the mainshaft 10. The countershaft 20 has fixed thereon, in order from left to right as shown in FIG. 1, a final drive gear 21, a third speed clutch C3, a spline hub S selectively engageable with either of a second speed driven gear 22 and a reverse driven gear 23, and a first speed driven gear 24. The first speed driven gear 24 is provided with a one-way clutch C4 for permitting torque transmission only in the direction from the mainshaft 10 to the countershaft 20. Moreover, the countershaft 20 has relatively rotatably loose-fitted thereon a third speed driven gear 25 integrally rotatable therewith when the third speed clutch C3 is connected, the second speed driven gear 22 and the reverse driven gear 23. The reverse gears 14 and 23 are connected to each other with an idler gear I interposed therebetween.

The final gear 21 is engaged with another final gear 26 connected to a differential gear 27 as shown in FIG. 1. From the differential gear 27, there are extending left and right axles 28, 29 to which left and right wheels WL, WR are fixed, respectively.

Figure 2:
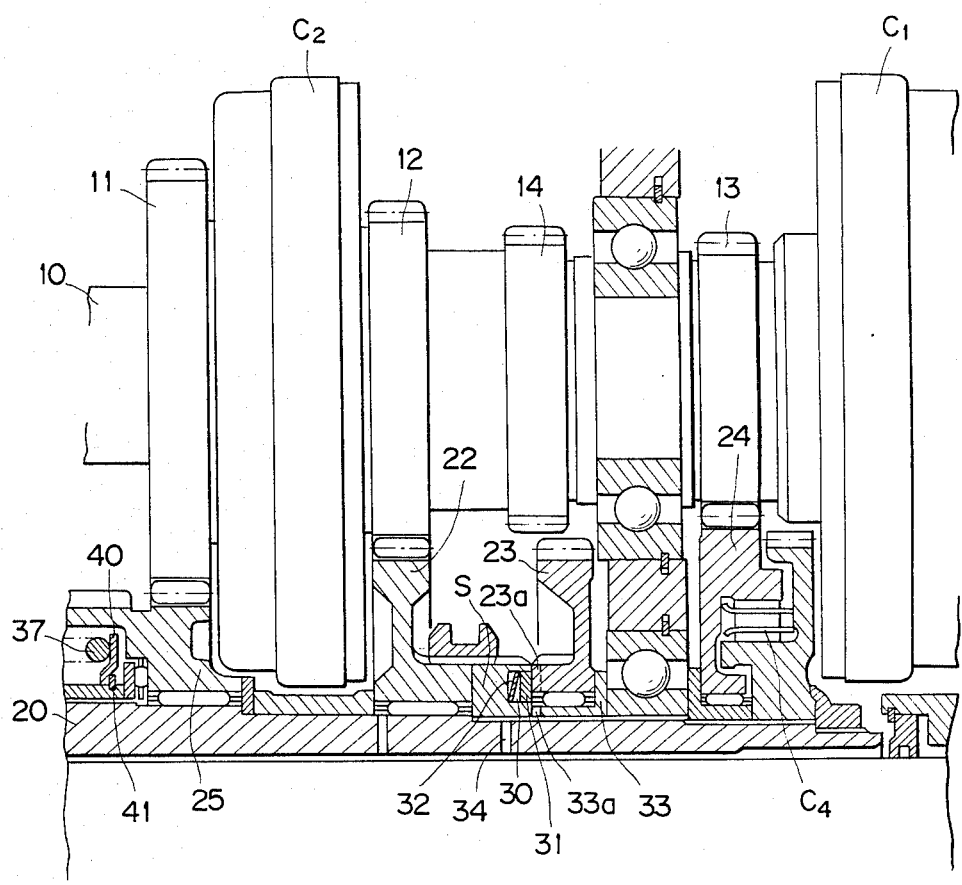
FIG. 2 is a partial diagrammatic view of the transmission shown in FIG. 1, in which an embodiment of the invention is employed.

In FIG. 2, the spline hub S on the countershaft 20 has its end face thereof, at the side of the reverse gear 23, formed therein with a ring slot 30 in which a ring member 31 is axially slideably fitted. The ring member 31 is normally biased rightwardly in FIG. 2 with a force under 50 Kg due to the resilience of a wavy spring 32 compressedly fitted in the ring slot 30.

Figure 3:
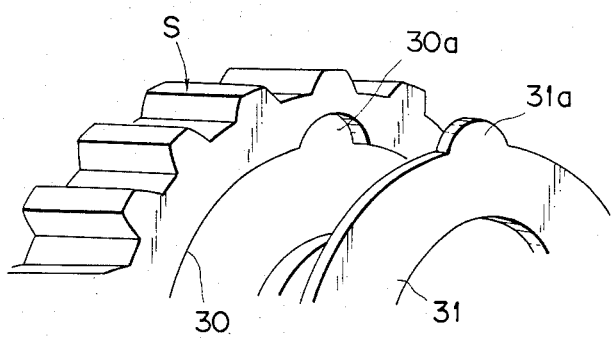
FIG. 3 is a sketch drawing of a spline hub of the embodiment shown in FIG. 2.

As shown in FIG. 3, the slot 30 of the spline hub S and the ring member 31 are formed with a concave recess 30a and a matching convex projection 31a, respectively, and prevented from relative rotation by an engagement between the concave recess 30a and the convex projection 31a. The spring 32 biasing the ring member 31 need not always be a wavy spring, but may comprise a plurality of coil springs arranged to as to act in the axial direction.

The reverse gear 23 and a bearing race 33 have their respective end faces thereof, at the side of the ring member 31, radially formed therein with pluralities of lubrication grooves 23a and 33a, respectively, and the countershaft 20 is drilled therethrough with a plurality of lubrication holes 34 communicating with the lubrication grooves 23a, 33a.

In a transmission for vehicles with the above-described arrangement, when driving at the third speed for example, the gears 11, 25 will transmit torque and the other gears will be idling. However, since the gear 23 is normally biased rightwardly as mentioned above, there will be substantially no sound generated due to the hitting of a reverse gear train 14, I, 23 having a largest virtual inertia movement, thus permitting an extremely smooth and calm operation.

The reverse gear 23 is prevented from vibration by friction forces acting on its surface in contact with the ring member 31, while the lubricant to be supplied to the third speed clutch C3 has its leak thereof admitted through the lubrication holes 34 and the lubrication grooves 33a and 23a onto the above contact surface, thereby always keeping the friction factor of the contact surface substantially constant.

Therefore, even in variation of engine torque, the gear train 14, I, 23 is kept from being vibrated and a part of the torque variation is effectively absorbed as the friction force and moderated.

Besides the above amendment which has an advantage that the gear train 14, I, 23 though single can be prevented from the vibration due to hitting, there will be described hereinbelow, with reference to FIG. 4, a transmission for vehicles in which also other gear trains are controllable against vibration and, when shifting speed, even the speed shifting shock can be effectively absorbed to be damped.

Figure 4:
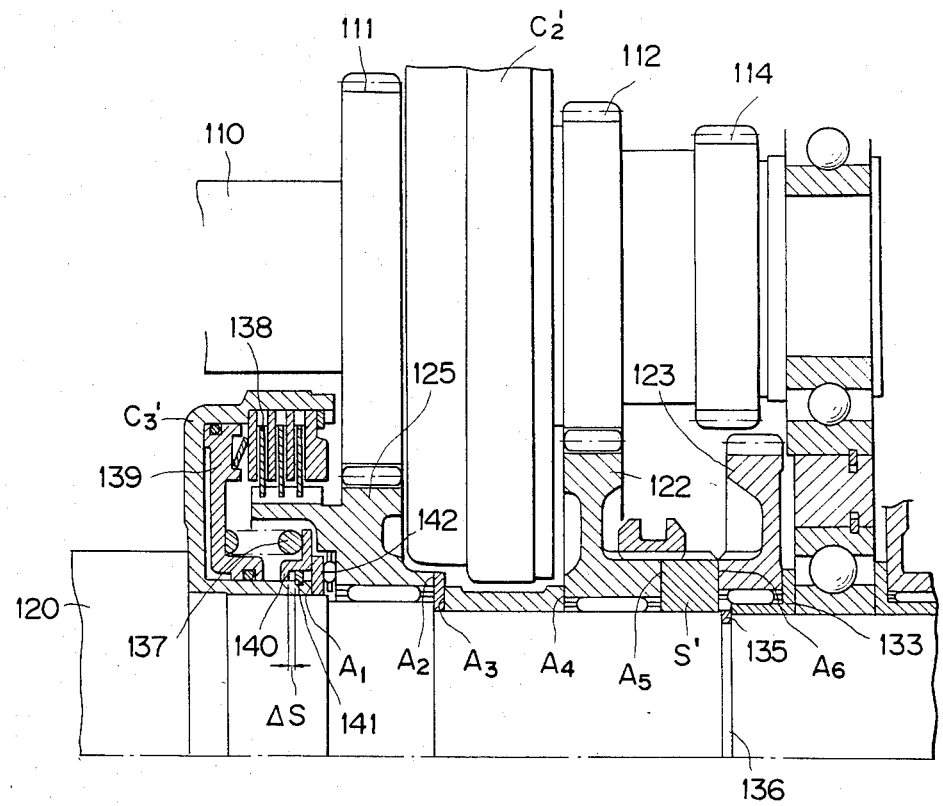
FIG. 4 is a partial diagrammatic view of the transmission shown in FIG. 1, in which another embodiment of the invention is employed.

In FIG. 4, a countershaft 120 is formed with a ring slot 136 for receiving a snap ring 135, and a bearing race 133 of a reverse driven gear 123 is so arranged as to be in abuttment with the snap ring 135. A spline hub S' is engaged with a key (not shown) provided on the countershaft 120, and thereby axially slideably fitted on the countershaft 120. Those parts fitted on the countershaft 120 at the left side relative to the snap ring 135 are all biased rightwardly in FIG. 4 with a return spring 137 in a third speed clutch C'3 as will be detailed later.

The clutch C'3 is of a known wet type clutch in which a plurality of clutch plates 138 are connectable and releaseable in response to axial movements of a piston 139 and the return spring 137 is adapted for use in the release action.

In the before-mentioned embodiment, a return spring 37 has the right end thereof secured through a retainer 40 to a snap ring 41. FIG. 2.

In this embodiment, however, a retainer 140 is arranged to be in abuttment with a thrust bearing 142 such that after the assembly to clearance $\Delta$ S is formed between the retainer 140 and a snap ring 141. So as to render the gear 123 and gears 122 and 125 rotatable relative to the countershaft 120, respective sliding surfaces A1 to A6 are provided with fine clearances which may be about 0.1 mm for example. In this embodiment, after installation of the return spring 137, its pushing force causes the above clearances to be reduced to the thickness of oil films formed to be interposed therein.

As a result, any time when the gears 122, 123 and 125 rotate relative to each other, friction forces due to the pushing force of the spring 137 will act as effective vibration control forces to prevent the hitting sound from being produced, thus permitting the provision of low-noise and calm transmission.

In the above arrangement, the gears 122 and 125 may be right-hand threaded helical gears, respectively, and in normal drive the countershaft 120 may be clockwise rotatable when viewed from the left in FIG. 4. Then, in the second speed or third speed engagement and when driving with a light load, the helical gears 122 and 125 will produce thrust forces in the yielding direction of the spring 137. Further, therefore, the helical gears 122 and 125 may have their helical angles thereof determined such that even in the above case the set load of the spring 137 can overcome the thrust forces, thereby to give sufficient vibration control forces between respective gears 122, 123 and 125.

In such arrangement, when an acceleration pedal is pressed down, against a very large torque then produced a return spring will resiliently support respective gears, thus causing the gears to be axially moved while producing a damping effect. Moreover, even when a torque variation takes place, the torque variation will have its part thereof changed into a part of the friction at respective relatively rotating surfaces of the gears and consumed as a heat energy, thus being effectively reduced while producing no vibration of the gears. This may be safely said also for the speed shifting shock, namely, when shifting speed, the torque variation will be absorbed to be moderated by the axial displacement of the gears and absorbed with the relative friction between contact surfaces, thus permitting the reduction of shock to be achieved.

In this embodiment, making the advantage of the spring of clutch, when shifting to the third speed, the piston 139 will move to the right, thus controlling the variation of the gear 123 with stronger forces and thereby permitting friction losses at the first and second speeds to be somewhat reduced.

Further, departing from the foregoing embodiments in which a vibration control is effected on a countershaft, a vibration control effect may be obtained on a mainshaft in a similar manner, as will be apparent.

Furthermore, the present invention may be applied to an automatic transmission of a planet gear type also.

As will be understood from the foregoing description, according to the present invention there is provided a transmission for vehicles in which an end face of a boss of at least one gear, not concerning the power transmission, on a shaft and a surface of another member, relatively rotating with respect to the gear, on the shaft are pushed to be brought into contact with each other by means of a spring, a part of the variation in engine torque can be effectively absorbed to be moderated, thus realizing a smooth and calm operation.

Although there have been described what are considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. A transmission for a vehicle including an engine and at least one drive wheel, comprising: a first shaft driven by the engine; a second shaft for driving the drive wheel; a plurality of gear trains interposed between said first and second shafts; said gear trains being selectable for transmitting power of the engine; at least one gear member arranged in one of said gear trains and fitted on either of said shafts; a rotatable member relatively rotatable with respect to said gear member and slideably fitted on said either shaft; and resilient means for resiliently forcing said rotatable member to be brought into frictionwise slideable contact with said gear member while said one gear train is left unselected.

2. A transmission according to claim 1, wherein: said resilient means comprises a spring member.

3. A transmission for a vehicle including an engine and at least one drive wheel, comprising:
   a first shaft driven by the engine;
   a second shaft for driving the drive wheel;
   a plurality of gear trains interposed between said first and second shafts; said gear trains being selectable for transmitting power of the engine; at least one gear member arranged in one of said gear trains and being a helical gear axially moveable fitted on either of said shafts; a rotatable member relatively rotatable with respect to said helical gear and slideably fitted on said either shaft; and a spring member resiliently forcing said rotatable member to be brought into frictionwise slideable contact with said helical gear while said one gear train is left unselected, said helical gear having a helical angle set such that a thrust forces produced by the torque being transmitted in normal drive push said gear in a direction opposing the resilient force of said spring member.

4. A transmission according to claim 3, being of an automatic type including a wet clutch, wherein: said spring member comprises a return spring of said wet clutch.

* * * * *